(12) United States Patent
Lindsay et al.

(10) Patent No.: US 7,853,149 B2
(45) Date of Patent: Dec. 14, 2010

(54) TRANSMITTER FREQUENCY PEAKING FOR OPTICAL FIBER CHANNELS

(75) Inventors: Thomas A. Lindsay, Brier, WA (US); Norman L. Swenson, Mountain View, CA (US)

(73) Assignee: ClariPhy Communications, Inc., Irvine, CA (US)

( * ) Notice: Subject to any disclaimer, the term of this patent is extended or adjusted under 35 U.S.C. 154(b) by 935 days.

(21) Appl. No.: 11/370,655

(22) Filed: Mar. 7, 2006

(65) Prior Publication Data

US 2006/0291869 A1 Dec. 28, 2006

Related U.S. Application Data

(60) Provisional application No. 60/659,924, filed on Mar. 8, 2005, provisional application No. 60/677,911, filed on May 4, 2005.

(51) Int. Cl.
*H04B 10/00* (2006.01)

(52) U.S. Cl. .............................. 398/93; 398/92; 398/94; 398/99

(58) Field of Classification Search ......... 398/158–161, 398/182–201
See application file for complete search history.

(56) References Cited

U.S. PATENT DOCUMENTS

| | | | |
|---|---|---|---|
| 5,272,723 A | 12/1993 | Kimoto et al. | |
| 5,475,518 A * | 12/1995 | Karaki | ........................ 398/201 |
| 5,652,668 A | 7/1997 | Aulet et al. | |
| 5,774,242 A | 6/1998 | O'Sullivan et al. | |
| 6,111,675 A * | 8/2000 | Mao et al. | ........................ 398/7 |
| 6,229,631 B1 | 5/2001 | Sato et al. | |
| 6,233,073 B1 | 5/2001 | Bowers et al. | |
| 6,242,979 B1 * | 6/2001 | Li | ............................. 330/149 |
| 6,259,543 B1 | 7/2001 | Golovchenko et al. | |
| 6,314,147 B1 | 11/2001 | Liang et al. | |
| 6,330,381 B1 | 12/2001 | Lu et al. | |
| 6,377,552 B1 | 4/2002 | Moran, III et al. | |
| 6,385,552 B1 | 5/2002 | Snyder | |
| 6,477,311 B2 | 11/2002 | Ishizaka | |
| 6,480,067 B1 | 11/2002 | Kobayashi et al. | |
| 6,560,720 B1 | 5/2003 | Chirashnya et al. | |
| 6,563,622 B2 * | 5/2003 | Mueller et al. | ............... 398/182 |
| 6,580,531 B1 | 6/2003 | Swanson et al. | |
| 6,694,104 B1 * | 2/2004 | Caplan et al. | ............... 398/197 |

(Continued)

FOREIGN PATENT DOCUMENTS

EP 1 394 969 A 3/2004

OTHER PUBLICATIONS

PCT International Search Report and Written Opinion, PCT/US06/08282, Apr. 26, 2007, 9 Pages.

(Continued)

*Primary Examiner*—Agustin Bello
(74) *Attorney, Agent, or Firm*—Fenwick & West LLP

(57) ABSTRACT

Frequency peaking is used in the transmitter to improve link performance. In one example, frequency peaking improves the $PIE_D$ or TWDP. The frequency peaking can result in pulse shapes that have more electrical energy in the receiver (and therefore higher received SNR) than uncompensated pulses. In addition, due to the response of typical fibers, boosting the high frequencies typically will flatten the received spectrum, which will improve the performance of the equalizer in an EDC receiver.

25 Claims, 6 Drawing Sheets

U.S. PATENT DOCUMENTS

| | | | |
|---|---|---|---|
| 6,768,577 | B2 | 7/2004 | Eggleton et al. |
| 6,832,051 | B2 | 12/2004 | Lu et al. |
| 6,865,343 | B1 | 3/2005 | Bierhoff et al. |
| 6,956,642 | B2 | 10/2005 | Franke et al. |
| 7,024,056 | B2 * | 4/2006 | Griffin ............................ 385/1 |
| 7,062,166 | B2 * | 6/2006 | Jacobowitz et al. ............ 398/32 |
| 7,095,956 | B2 | 8/2006 | Levandovsky et al. |
| 7,102,739 | B2 | 9/2006 | Endo et al. |
| 7,110,449 | B2 | 9/2006 | Heo et al. |
| 7,147,387 | B2 | 12/2006 | Aronson et al. |
| 7,154,924 | B2 | 12/2006 | Sanchez |
| 7,161,666 | B2 | 1/2007 | French et al. |
| 7,181,146 | B1 | 2/2007 | Yorks |
| 7,187,435 | B2 | 3/2007 | Franke et al. |
| 7,233,962 | B2 | 6/2007 | Summerfield et al. |
| 7,263,287 | B2 | 8/2007 | Xu |
| 7,280,765 | B2 | 10/2007 | Chowdhury et al. |
| 7,363,562 | B2 | 4/2008 | Waschura et al. |
| 7,389,045 | B2 | 6/2008 | Fee |
| 7,389,470 | B2 | 6/2008 | Heo et al. |
| 7,406,266 | B2 * | 7/2008 | Mahgerefteh et al. ....... 398/186 |
| 7,466,927 | B2 * | 12/2008 | Chandler .................... 398/193 |
| 7,496,133 | B2 * | 2/2009 | Fujimori et al. ............. 375/219 |
| 2001/0035994 | A1 | 11/2001 | Agazzi |
| 2002/0167703 | A1 * | 11/2002 | Merritt ....................... 359/173 |
| 2002/0172458 | A1 * | 11/2002 | Downie ....................... 385/31 |
| 2003/0058509 | A1 * | 3/2003 | Webb et al. .................. 359/187 |
| 2003/0123884 | A1 * | 7/2003 | Willner et al. .............. 398/212 |
| 2003/0175036 | A1 * | 9/2003 | Mamyshev et al. ......... 398/188 |
| 2004/0228635 | A1 * | 11/2004 | Price ........................... 398/149 |
| 2005/0084270 | A1 * | 4/2005 | Caplan et al. ............... 398/141 |
| 2005/0191059 | A1 | 9/2005 | Swenson et al. |
| 2005/0271394 | A1 * | 12/2005 | Whiteaway et al. ......... 398/188 |
| 2006/0067688 | A1 | 3/2006 | Inman et al. |
| 2006/0069971 | A1 | 3/2006 | Waschura et al. |
| 2006/0291869 | A1 * | 12/2006 | Lindsay et al. .............. 398/183 |
| 2007/0036084 | A1 | 2/2007 | Lindsay et al. |
| 2007/0064775 | A1 | 3/2007 | Petre et al. |
| 2007/0064923 | A1 * | 3/2007 | Schmukler et al. ....... 379/406.1 |
| 2008/0101794 | A9 | 5/2008 | Swenson et al. |
| 2008/0107424 | A1 * | 5/2008 | Tonietto et al. ............. 398/136 |

OTHER PUBLICATIONS

Bhoja, S., "Channel Metrics for EDC-based 10GBASE-LRM," Big Bear Networks, IEEE 802.3aq Task Force, Jul. 2004, pp. 1-15, [online] [Retrieved on Oct. 13, 2006] Retrieved from the Internet <URL:http://grouper.ieee.org/groups/802/3/aq/public/jul04/bhoja_1_0704.pdf>.

Swenson, N., et al., "Explanation of IEEE 802.3, clause 68 TWDP," Jan. 5, 2006, 4 pages, ClariPhy Communications, Inc., [online] [Retrieved on Oct. 13, 2006] Retrieved from the Internet <URL:http://ieee802.org/3/aq/public/tools/TWDP.pdf>.

International Search Report and Written Opinion, PCT/US05/47041, Sep. 11, 2006, 10 pages.

Agrawal, G.P., "Paragraph 3.5: Laser Characteristics ED," Fiber Optic Communication Systems, Third Edition, John Wiley and Sons, Inc. Jan. 2002, pp. 106-118.

European Extended Search Report, European Application No. 06737453.8, Dec. 10, 2009, 7 pages.

European Examination Report, European Application No. 06737453.8, Mar. 19, 2010, 1 page.

* cited by examiner

TRANSMITTER FREQUENCY PEAKING FOR OPTICAL FIBER CHANNELS

CROSS-REFERENCE TO RELATED APPLICATION(S)

This application claims priority under 35 U.S.C. §119(e) to U.S. Provisional Patent Application Ser. No. 60/659,924, "Transmitter frequency peaking for dispersive optical fiber channels," filed Mar. 8, 2005; and to U.S. Provisional Patent Application Ser. No. 60/677,911, "A New Approach to Measure Tx Signal Strength and Penalty," filed May 4, 2005. The subject matter of all of the foregoing is incorporated herein by reference in its entirety.

BACKGROUND OF THE INVENTION

1. Field of the Invention

This invention relates generally to the transmission of data over optical fibers and, more particularly, to the use of frequency peaking in transmitters to improve the performance of the transmission.

2. Description of the Related Art

Optical fiber is widely used as a communications medium in high speed digital networks, including local area networks (LANs), storage area networks (SANs), and wide area networks (WANs). There has been a trend in optical networking towards ever-increasing data rates. While 100 Mbps was once considered extremely fast for enterprise networking, attention has recently shifted to 10 Gbps, 100 times faster. As used in this disclosure, 10 Gigabit (abbreviated as 10 G or 10 Gbps) systems are understood to include optical fiber communication systems that have data rates or line rates (i.e., bit rates including overhead) of approximately 10 Gigabits per second.

Regardless of the specific data rate, application or architecture, communications links (including optical fiber communications links) invariably include a transmitter, a channel and a receiver. In an optical fiber communications link, the transmitter typically converts the digital data to be sent to an optical form suitable for transmission over the channel (i.e., the optical fiber). The optical signal is transported from the transmitter to the receiver over the channel, possibly suffering channel impairments along the way, and the receiver then recovers the digital data from the received optical signal.

A typical 10 G optical fiber communications link 100 is shown in FIG. 1. The link 100 include a transmitter 105 coupled through optical fiber 110 (the channel) to a receiver 120. A typical transmitter 105 may include a serializer, or parallel/serial converter (P/S), 106 for receiving 10 G data from a data source on a plurality of parallel lines and providing serial data to a 10 G laser driver 107. The laser driver 107 then drives a 10 G laser 108 which launches an optical signal carrying the data on optical fiber 110.

A typical receiver 120 includes a 10 G photodetector 111 for receiving and detecting data from the fiber 110. The detected data is typically processed through a 10 G transimpedance amplifier 112, a 10 G limiting amplifier 113, and a 10 G clock and data recovery unit 114. The data may then be placed on a parallel data interface through a serial/parallel converter (S/P) 115.

In an optical fiber communications system, the optical power output by a laser is commonly modulated in a binary fashion to send data over an optical fiber. Nominally, the optical power is high for the duration of a bit period to send a logical "1," and low to send a logical "0." This is commonly referred to as on-off-keying, where "on" means high laser power and "off" means low laser power. In nonreturn-to-zero (NRZ) modulation, the output power stays at nominally the same level for an entire bit period. In actuality, the level is not perfectly constant for the entire bit period due to various effects. Nonetheless, a common feature of NRZ modulation is that a long string of zeros or a long string of ones will each result in an optical signal that tends to a constant steady state value.

Standards play an important role in networking and communications. Since components in the network may come from different vendors, standards ensure that different components will interoperate with each other and that overall system performance metrics can be achieved even when components are sourced from different vendors. There are a number of standards that relate to 10 G fiber networks. For example, the IEEE 802.3aq committee is developing a new standard (10GBASE-LRM) for 10 G Ethernet over multimode fiber over distances of up to 220 meters using electronic dispersion compensation (EDC). This standard is in a draft state, currently documented in IEEE Draft P802.3aq/D3.1, Draft amendment to: IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Physical Layer and Management Parameters for 10 Gb/s Operation, Type 10GBASE-LRM, which is incorporated herein by reference.

Standards committees define agreed-upon metrics to quantify performance of various components of the system being standardized. For example, in the case of optical fiber communications link, a quantity known as Optical Modulation Amplitude (OMA) is often used to characterize the signal strength of the transmitted optical waveform. OMA is the difference in optical power for the nominal "1" and "0" levels of the optical signal. Another parameter used to characterize an optical fiber transmission is the extinction ratio (ER), which is the ratio of the nominal "1"optical power level to the nominal "0"optical power level. Techniques for measuring both OMA and ER are defined in the IEEE 802.3aq draft standard. The technique defined by 802.3aq to measure OMA is to capture samples of a test waveform using a sampling oscilloscope. The test waveform is a square waveform consisting of several consecutive 1's followed by several consecutive 0's in a repeating pattern. The mean optical power level of an optical 1 is measured over the center 20% of the time interval where the signal is high, and similarly for 0's when the signal is low. The frequency of the square wave used to measure the OMA will be referred to as the "OMA measurement frequency." The OMA quantity as a measure of transmitter power can be used to normalize performance metrics relative to a standardized transmitter power.

One such performance metric is the optical power penalty. Assume that some signal quality effect causes a drop in the signal to noise ratio of a certain amount. The impact of that effect can be characterized by an optical power penalty. The optical power penalty is the decrease in optical power (e.g., as measured by OMA in certain cases) that would result in the same drop in the signal to noise ratio. All else being equal, a lower power penalty means a better signal to noise ratio (and better performance) than a higher power penalty.

One measure of optical power penalty is referred to as $PIE_D$ (Penalty for Ideal Equalizer—DFE). See for example, S. Bhoja, "Channel metrics for EDC-based 10GBASE-LRM," IEEE 802.3aq Task Force, July 2004, available online at: http://grouper.ieee.org/groups/802/3/aq/public/jul04/bhoja 1 0704.pdf which is incorporated herein by reference. $PIE_D$ is a calculation for optical power penalty for a type of EDC known as decision feedback equalization (DFE) and is given in optical dB by $$PIE_D = 5\log_{10}\left(\exp\left(-2T\int_0^{\frac{1}{2T}} \ln\left(\frac{1}{T}|H_a(f)|^2 + \sigma^2\right)df\right)\right). \quad (1)$$

$PIE_D$ is the ratio of two signal-to-noise ratios (SNRs). The first signal-to-noise ratio is a matched filter bound SNR, $SNR_{MFB\text{-}Rect}$, which is the SNR of a matched filter receiver that receives a perfect rectangular non-return-to-zero (NRZ) pulse. The second SNR is $SNR_{DFE}$, which is the SNR realized at the slicer of an ideal infinite-length DFE receiver assuming that the channel can be modeled as linear. T is the bit period (1/line rate), $\sigma$ is $1/SNR_{MFB\text{-}Rect}$, and $|H_a(f)|^2$ is the folded spectrum defined by $$|H_a(f)|^2 = \frac{1}{T}\sum_{n=-\infty}^{\infty} \left|H\left(f+\frac{n}{T}\right)\right|^2 \quad (2)$$

where H(f) is the Fourier Transform of h(t), and h(t) is the response of the normalized channel to a rectangular pulse of duration T and amplitude 1. In this sense the normalized channel includes filtering by the transmitter, the fiber channel, and the front-end filter of the optical receiver. Therefore, h(t) is the convolution of a rectangular pulse with the impulse responses of filters characterizing those elements. The channel is normalized such that H(0) is equal to T. Both $SNR_{MFB\text{-}Rect}$ and $SNR_{DFE}$ are computed assuming that the minimum OMA allowed by the standard is transmitted (which effectively determines $\sigma$ in Eqn. 1).

$PIE_D$ is the optical power penalty corresponding to a given channel response H(f) assuming that the channel is linear. Other penalty measures include, for example, the transmit waveform and dispersion penalty (TWDP) as defined in the IEEE 802.3aq draft standard and described further in N. Swenson et al., "Explanation of IEEE 802.3, clause 68 TWDP," available online at http://ieee802.org/3/aq/public/tools/TWDP.pdf, which is incorporated herein by reference. The TWDP test is a compliance test for a transmitter and computes a penalty similar to that computed by PIE-D for a reference fiber channel and reference receiver. TWDP differs from $PIE_D$ in that TWDP does not assume that the transmitter is linear and it uses a finite-length equalizer in the equalizing receiver.

While in theory it may be possible to overcome a power penalty by simply increasing the transmitted OMA, it has been observed in practice that when $PIE_D$ or TWDP exceeds a certain value, reliable communication with a practical receiver is not possible, regardless of the transmitted OMA. For this reason, the 802.3aq committee placed an upper bound on the allowable TWDP for a compliant transmitter. Since TWDP and $PIE_D$ are both based on normalized OMA, these penalties cannot be reduced by increasing the OMA of the transmitter. A conventional method of reducing the transmitter power penalty (TWDP) is to improve the quality of the transmitted signal such that the signal more closely approximates a perfect rectangular NRZ waveform. This, however, can add significant cost to the transmitter. Therefore, a need exists to reduce the transmitter power penalty (and other penalties) in a cost effective manner, thus increasing the performance of the communications link.

SUMMARY OF THE INVENTION

The present invention overcomes the limitations of the prior art by using frequency shaping (e.g., frequency peaking) in the transmitter. Generally speaking, shaping the frequency spectrum of the transmitter in a manner that increases the AC power of the electrical signal after photodetection at the receiver can result in better performance. Moreover, accomplishing this power increase at the receiver in a manner that does not increase the transmitted OMA results in lower power penalties, even compared to ideal transmitters that produce perfectly rectangular pulses. Thus, it is possible to reduce $PIE_D$ and TWDP by shaping the overall channel response H(f).

In one aspect of this invention, frequency peaking is employed to reduce the $PIE_D$ or TWDP penalty. The frequency peaking can result in pulse shapes that have more electrical energy (and therefore higher received SNR) than uncompensated pulses (i.e., ideal rectangular pulses). In addition, due to the lowpass nature of the combined frequency response of typical fibers with the receiver front-end filter, boosting the high frequencies will generally tend to flatten the received spectrum, which will improve the performance of the equalizer in an EDC receiver.

In one aspect, an optical transmitter produces an optical signal that is suitable for transmission over an optical fiber. The optical signal encodes data that is being transmitted at a certain data rate (or line rate). Compared to the frequency spectrum of a reference optical signal produced by an ideal rectangular pulse transmitter encoding the same data, the frequency spectrum of the optical signal produced by this transmitter has a relative peak at a peak frequency located in a vicinity of the line rate. Alternately, the transmitter can be modeled as an ideal rectangular pulse transmitter that produces perfectly rectangular pulses followed by a transmit filter, where the transmit filter has a frequency response that peaks at a frequency (the peak frequency) that is located in a vicinity of the line rate. In various implementations, the peak frequency can be located between 10% and 100% of the line rate, between 25% and 75% of the line rate, and/or at approximately 30-50% of the line rate.

In one implementation, the frequency peaking is achieved by a pre-emphasis network that boosts the peak frequency relative to the value of the continuous power spectrum at the DC frequency (and/or relative to the power spectrum at the OMA measurement frequency in the case of AC coupling). One example would be a filter that has a transfer function of (1+x)−xD, where x is a fraction between 0 and 1 (e.g., x=0.25), and D is a delay equal to one period of the line rate (or one pulse period for NRZ transmission).

In another implementation, the frequency peaking is achieved by utilizing the relaxation oscillation behavior of a laser. Many lasers exhibit relaxation oscillation which, if not corrected, can cause overshoot or ringing in the optical pulses produced. In most transmitters, the laser transmitter is designed to suppress this effect, thus producing a well-behaved rectangular pulse. However, in one aspect of the invention, the laser transmitter instead utilizes the laser relaxation oscillation in order to boost the peak frequency relative to the DC frequency and/or relative to the OMA measurement frequency.

In another implementation, peaking is achieved by tuning a matching network located between the laser driver and the laser. The matching network boosts currents at higher frequencies. The network is typically passive and can include resistors, capacitors, inductors, and lengths of transmission line.

Frequency peaking can be applied to many different applications. Examples include 10 G communications links. Example standards include 10GBASE-LRM. Example transmitter form factors include X2, XENPAK, XPAK, XFP, SFP+, 300-pin, SFP, SFF, GBIC, etc. Other aspects of the invention include methods corresponding to the devices and systems described above, and applications for all of the above.

BRIEF DESCRIPTION OF THE DRAWINGS

The invention has other advantages and features which will be more readily apparent from the following detailed description of the invention and the appended claims, when taken in conjunction with the accompanying drawings, in which:

Figure 1:
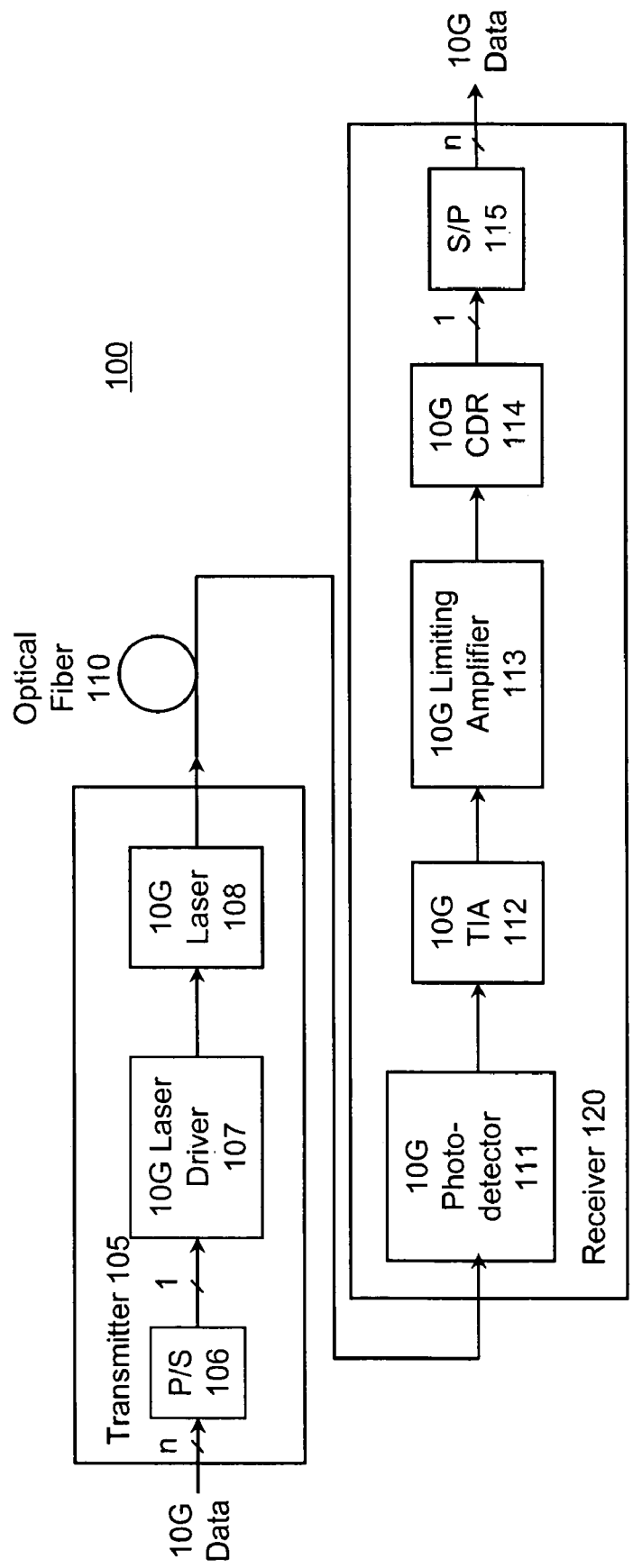
FIG. 1 (prior art) is a block diagram of an optical fiber communications link.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The following mathematical discussion shows how a properly shaped pulse can have significantly more electrical energy than an ideal rectangular pulse while having the same OMA. This discussion relates to the Matched Filter Bound SNR, $SNR_{MFB}$, which is the upper bound on the SNR that can be realized by an equalizing receiver that uses a zero-forcing criterion. ($PIE_D$ and TWDP are based on the minimum mean-squared error criterion instead of the zero-forcing criterion, but the performance is nearly identical for the low-noise channels of interest.) Increasing $SNR_{MFB}$ at the receiver will generally improve the SNR at the slicer of the equalizing receiver, resulting in a reduced penalty. Furthermore, shaping the transmit spectrum in such a way that the resulting folded spectrum $|H_a(f)|^2$ in Eqn. 1 is approximately constant over the interval from 0 to ½T will reduce the gap between the SNR at the equalizer slicer and $SNR_{MFB}$ at the receiver. We refer to this gap as "equalizer loss." Therefore, frequency peaking can have two beneficial effects: 1) increasing $SNR_{MFB}$ at the receiver, and 2) decreasing the equalizer loss. Both of these effects are achieved without increasing OMA. Therefore, they reduce $PIE_D$ and TWDP.

Let an optically modulated signal be given by $$y(t) = B + A \sum_n a(n)p(t - nT) \quad (3)$$

where $a(n) \in \{-1, +1\}$ is the underlying data, p(t) is the pulse shape, T is the period of the data transmission (i.e., 1/line rate), and A and B are constants. y(t) is the optical signal power. Let the energy in the pulse p(t) be defined by $$\epsilon_p = \int p(t)^2 dt \quad (4)$$

If y(t) is converted to an electrical signal (assuming perfect E/O conversion) and then corrupted by additive white Gaussian noise with a two-sided power spectral density of $N_0/2$, the matched filter bound SNR is given by $$SNR_{MFB} \equiv A(2\epsilon_p/N_0)^{1/2} \quad (5)$$

where $SNR_{MFB}$ is defined in the optical power domain. If defined in the electrical power domain, $SNR_{MFB}$ would be the square of the quantity defined in Eqn. 5. With $SNR_{MFB}$ defined in the optical power domain, $BER = Q(SNR_{MFB})$ for a matched filter receiver receiving an isolated pulse, where Q( ) is the Gaussian error probability function $$Q(y) = \int_y^\infty \frac{1}{\sqrt{2\pi}} e^{-\frac{x^2}{2}} dx \quad (6)$$

For a perfect square wave modulation with infinite extinction ratio (i.e., the nominal optical power level of a transmitted "0" is zero), B is the average power $P_{ave} = OMA/2$, A=OMA/2, p(t) is a rectangular pulse of magnitude 1 and duration T (a single bit period), $\epsilon_p = T$, and $$SNR_{MFB} = OMA(T/(2N_0))^{1/2} \quad (7)$$

Figure 2:
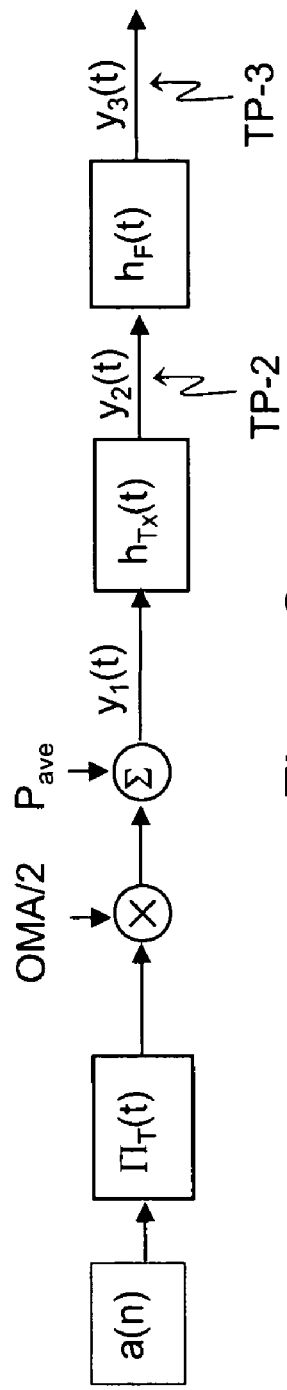
FIG. 2 is a block diagram of a transmitter according to the invention.

Now consider an example channel that can be modeled as shown in FIG. 2 where $$\Pi_T(t) = 1 \text{ for } |t| \leq \frac{1}{2} \text{ and 0 elsewhere.} \quad (8)$$

In this figure, $h_{Tx}(t)$ is a transmit filter that represents the response of the transmitter and $h_F(t)$ is a filter that represents the response of the fiber. The model can also include a receive filter $h_R(t)$ (not shown in FIG. 2) that represents a front end electrical filter in the receiver. For the 10GBASE-LRM application, this front-end receiver filter can generally be modeled as a fixed 7.5 GHz 4$^{th}$-order Bessel-Thomson filter. Note that $y_1(t)$ is the optical signal that would be produced by an ideal rectangular pulse transmitter. Because we are dealing with modulated optical power, OMA, $P_{ave}$, the transmit filter, and the fiber filter are all constrained such that $y_i(t)$ must be nonnegative. For example, OMA ≤ 2 $P_{ave}$. Other constraints on $h_{Tx}(t)$ and $h_F(t)$ are less obvious and will be important later.

The transmit filter and fiber filter are normalized such that $H_{Tx}(0) = 1$ and $H_F(0) = 1$, where H(f) denotes the Fourier Transform of h(t). With this normalization, the filters conserve optical power, or alternatively, conserve DC power. The assumption that $H_{Tx}(0) = 1$ is not meant to exclude the case of AC coupling in the transmitter. It is merely a model that simplifies analysis. Alternatively one could assume that $H_{Tx}(f_{OMA})=1$, where $F_{OMA}$ is the OMA measurement frequency. It can then be shown that each of the $y_i(t)$ can be written in the form $$y_i(t) = P_{ave} + \frac{OMA}{2} \sum_n a(n) p_i(t - nT) \tag{9}$$

Specifically, $p_1(t)=\Pi_T(t)$, $p_2(t)=p_1(t)*h_{Tx}(t)$, and $p_3(t)=p_2(t)*h_F(t)$, where * denotes convolution. Note that each $p_i(t)$ has the property $$\sum_n p_i(t - nT) = 1 \tag{10}$$

(Any pulse shape generated by filtering a rectangular pulse of duration T has the property that an infinite train of such pulses sums to a constant value). Conversely, one can show that any pulse shape with this property can be generated by filtering a rectangular pulse. In this sense, the channel model is completely general for a linear NRZ modulation.

Let $MFB_i$ denote $SNR_{MFB}$ for $y_i(t)$ and $\epsilon_i$ denote the corresponding pulse energy, then $$MFB_i = OMA/2(2\epsilon_i/N_0)^{1/2} \tag{11}$$

Note that with $h_F(t) \geq 0$ for all t (as it is with the LRM model), it follows that $\epsilon_3 \leq \epsilon_2$, with strict inequality unless $h_F(t)=\delta(t)$. Therefore, fiber propagation causes an unrecoverable reduction in the matched filter bound. This is not equalizer loss, since it is not due to ISI. It is a reduction in the theoretically best SNR achievable in the absence of ISI.

While $h_F(t) \geq 0$ for all t, there is no such constraint on $h_{Tx}(t)$. There are, however, other constraints on $h_{Tx}(t)$ resulting from constraints on the pulse $p_2(t)$ at the output of the filter. Let $p_2(t) = \Pi_T(t) * h_{Tx}$. It can be shown that $$\tfrac{1}{2} - P_{ave}/OMA \leq p_2(t) \leq \tfrac{1}{2} + P_{ave}/OMA \tag{12}$$

Note that the lower bound is less than or equal to zero and the upper bound is greater than or equal to 1, with equality in both cases for infinite extinction ratio ($P_{ave}$=OMA/2).

Proof: We know that $$y_2(t) = P_{ave} + \frac{OMA}{2} \sum_n a(n) p_2(t - nT) \geq 0 \tag{13}$$

where the inequality holds for all t and any sequence a(n). Consider the sequence a(n)=1 for all n except 0, and a(0)=−1. Then a(n)=1-2 $\delta_n$ (where $\delta_n$ is the Kroneker delta function), and $$y_2(t) = P_{ave} + \frac{OMA}{2}\left(-2 p_2(t) + \sum_n p_2(t - nT)\right) \tag{14}$$

$$= P_{ave} + \frac{OMA}{2} - OMA \cdot p_2(t) \geq 0$$

This gives the upper bound on $p_2(t)$. The lower bound on $p_2(t)$ is similarly obtained by considering the sequence a(n)=−1+2 $\delta_n$. With the lower bound on $p_2(t)$ determined above, note that $p_2(t)$ cannot go negative unless $P_{ave} > OMA/2$, which is the condition for finite extinction ratio.

Precompensation (or predistortion) can be used to improve the performance of LRM links by boosting high frequencies in the transmitted pulse p2(t) by shaping the transmit filter $h_{Tx}(t)$. In order to boost high frequencies with respect to DC (i.e., to implement frequency peaking), a finite extinction ratio is used to allow $p_2(t)$ to go negative. Show this as follows. Suppose $p_2(t) \geq 0$ for all t. Letting $P_2(f)$ denote the Fourier Transform of $p_2(t)$, then $$|P_2(f)|^2 = \int \cos(2\pi f \tau) R_2(\tau) d\tau \text{(using } R_2(\tau) = R_2(-\tau)) \tag{15}$$

where $$R_2(\tau) = \int p_2(t) p_2(t-\tau) d\tau \tag{16}$$

Since $p_2(t) \geq 0$ by assumption, $R_2(\tau) \geq 0$. Therefore $\cos(2\pi f \tau) R_2(\tau) \leq R_2(\tau)$, and $$|P_2(f)|^2 \leq \int R_2(\tau) d\tau = |P_2(0)|^2 \tag{17}$$

Therefore if $p_2(t) \geq 0$ for all t, $|P_2(f)|$ is upper bounded by its value at DC, so high frequency boosting is not possible.

Aside from changing the spectral shape of the transmit pulse, precompensation changes the matched filter bound of $y_2(t)$. For a given $P_{ave}$ and OMA, $p_2(t)$ is constrained as determined above. The maximum value possible for $\epsilon_2$ is achieved when $p_2(t)$ is set equal to its maximum allowable absolute value for the maximum duration possible while maintaining the condition that an infinite train of such pulses sums to 1. There are several possible pulse shapes that achieve this. One choice is $$p_2(t) = (\tfrac{1}{2} + P_{ave}/OMA) \Pi_T(t) + (\tfrac{1}{2} - P_{ave}/OMA) \Pi_T(t-T) \tag{18}$$

This corresponds to a transmit filter $h_{Tx}(t)$ of $$h_{Tx}(t) = (\tfrac{1}{2} + P_{ave}/OMA) \delta(t) + (\tfrac{1}{2} - P_{ave}/OMA) \delta(t-T) \tag{19}$$

With this $p_2(t)$, we obtain the maximum $\epsilon_2$ achievable for a given OMA and $P_{ave}$, i.e., $$\epsilon_{2,max}(OMA) = T[(1/2 + P_{ave}/OMA)^2 + (1/2 + P_{ave}/OMA)^2] \tag{20}$$
$$= T[1/2 + 2(P_{ave}/OMA)^2]$$

and $$MFB_{2,max}(OMA) = OMA(\epsilon_{2,max}(OMA)/2N_0)^{1/2} \tag{21}$$
$$= OMA(1/2 + 2(P_{ave}/OMA)^2)^{1/2} (T/2N_0)^{1/2}$$
$$= \left(\frac{OMA^2 + (2P_{ave})^2}{2}\right)^{1/2} \left(\frac{T}{2N_0}\right)^{1/2}$$

This is the maximum value of $MFB_2$ for a given OMA and $P_{ave}$. This expression leads to three observations:

1. When the extinction ratio is finite (that is, when the nominal optical power for a "0" is strictly positive), precompensation can always improve the matched filter bound at the transmitter, i.e., $MFB_{2,max}(OMA) > MFB_1 = OMA (T/2N_0)^{1/2}$. This follows from the fact that $OMA \leq 2P_{ave}$ when the extinction ratio is finite.

2. For a given $P_{ave}$, $MFB_2$ is maximized by increasing OMA to its maximum value of $2P_{ave}$, which corresponds to infinite extinction ratio. This results in a transmitted pulse shape $p_2(t)$ that is rectangular, as can be seen in Eqn. 18. Therefore, precompensation does not improve over the MFB obtained with infinite extinction ratio rectangular pulses. In that case $OMA=2P_{ave}$, $MFB_{2,max}(OMA)=2$ $P_{ave}$ $(T/2N_0)^{1/2} = MFB_1$, and $h_{Tx}(t) = \delta(t)$. While it may seem that precompensation in this case is not advantageous in terms of increasing $SNR_{MFB}$ at the transmitter, there are still good reasons for using it. First, the penalties defined above are based on normalized OMA power. Recall that $PIE_D$ is the ratio of $SNR_{MFB-Rect}$ to the actual SNR achieved at the slicer of the equalizer, both computed assuming that $OMA_{min}$ is transmitted. Therefore the transmitter is not credited for OMA greater than $OMA_{min}$ in the calculation of the penalty. For a given $P_{ave} > OMA_{min}/2$, the penalty can be reduced by decreasing OMA from its maximum value of $2P_{ave}$, thereby decreasing extinction ratio to a finite value, and applying precompensation as described above. Furthermore, maximization of $MFB_2$ by using rectangular pulses and an infinite extinction ratio is based on the simple linear model of modulation given in Eqn. 3. With real laser transmitters there are other good reasons to use a smaller extinction ratio, such as avoidance of nonlinearities (which improves TWDP) or spectral shaping to minimize equalizer loss.

3. As OMA goes to 0, $MFB_{2,max}$ does not tend to 0, but instead approaches a positive value equal to $P_{ave}(T/N_0)^{1/2}$. In the limiting case, $$y_2(t) = \lim_{OMA \to 0} P_{ave} + \frac{OMA}{2} \sum_n a(n) p_2(t - nT) \qquad (22)$$

where $$p_2(t) = \qquad (23)$$
$$(1/2 + P_{ave}/OMA) \prod_T (t) + (1/2 - P_{ave}/OMA) \prod_T (t-T)$$

Hence $$y_2(t) = P_{ave} + \frac{P_{ave}}{2} \sum_n a(n) \tilde{p}_2(t - nT) \qquad (24)$$

where $$\tilde{p}_2(t) = \prod_T (t) - \prod_T (t - T) \qquad (25)$$

This is equivalent to $$y_2(t) = P_{ave} + \frac{P_{ave}}{2} \sum_n a'(n) \Pi_T(t - nT) \qquad (26)$$

where $$a'(n) = a(n) - a(n-1) \qquad (27)$$

This corresponds to 1-D precoding, where $a'(n) \in \{-2, 0, +2\}$. This can be considered a degenerate case of precompensation that gives a null at DC. Because of the null at DC, it cannot be modeled as shown in FIG. 2 with a nonzero OMA and $H_{Tx}(0) = 1$. However, a slight modification of FIG. 2 that would apply to the limiting case is readily apparent from Eqns. 24 and 25 with $h_{Tx}(t) = \delta(t) - \delta(t-T)$. In the limiting case, FIG. 2 would be modified such that $P_{ave}/2$ replaces OMA/2, and $P_{ave}$ is added after, instead of before, the transmit filter $h_{Tx}(t)$.

The mathematics above show that frequency peaking can increase the transmitter matched filter bound SNR over that of a rectangular pulse without increasing the OMA. Provided that this increased energy is in a frequency band passed by the fiber and receiver transfer functions, this increased SNR at the transmitter translates to an increased $SNR_{MFB}$ at the receiver. As long as the equalizer loss does not increase more than the increase in $SNR_{MFB}$, the resulting power penalty will decrease. The best frequency peaking will result in an increase in the received $SNR_{MFB}$ and a decreased equalizer loss. The net effect on $PIE_D$ can be mathematically determined by the effect of the resulting folded spectrum $|H_a(f)|^2$ on the penalty in Eqn. 1.

Frequency peaking can be implemented in the transmitter in a number of different ways. FIGS. 3-7 illustrate one approach based on the use of pre-emphasis networks in the laser driver. FIGS. 8-11 illustrate another approach utilizing the opto-electronic overshoot properties of laser diodes, commonly known as relaxation oscillation.

Figure 3:
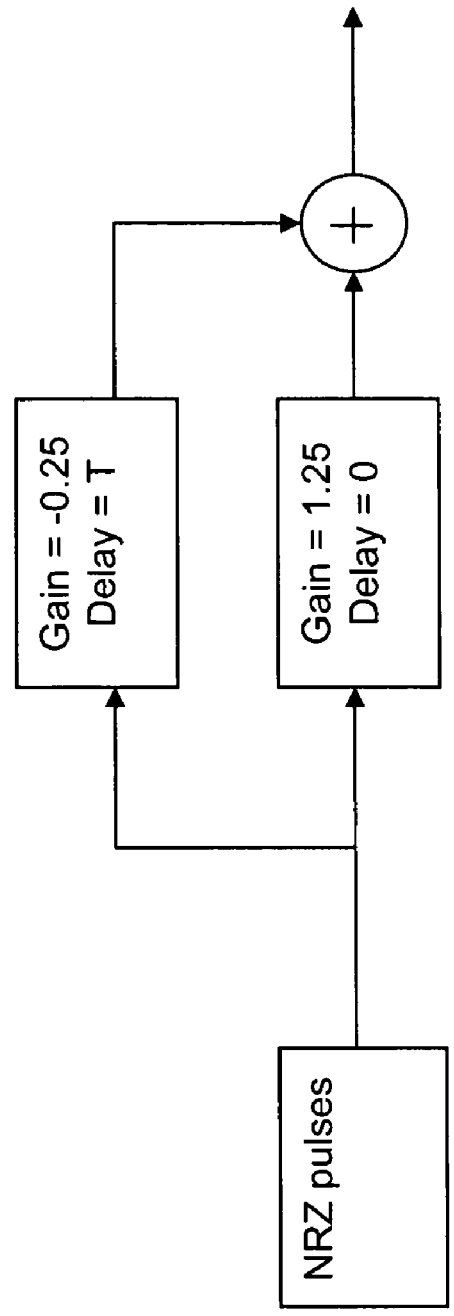
FIG. 3 is a block diagram of a pre-emphasis network according to the invention.

FIG. 3 shows a block diagram of a pre-emphasis network that can be implemented at 10 GHz. This circuit implements a transfer function of 1.25-0.25D, where D is a one bit delay (T). The DC response of this circuit is 1, but it boosts the higher frequencies in the signal spectrum. The pre-emphasis network can be implemented in different ways. For example, it can be clocked (in which case frequency peaking at approximately 50% of the line rate can be conveniently implemented). Alternately, it can be implemented by a passive network.

Figure 4A:
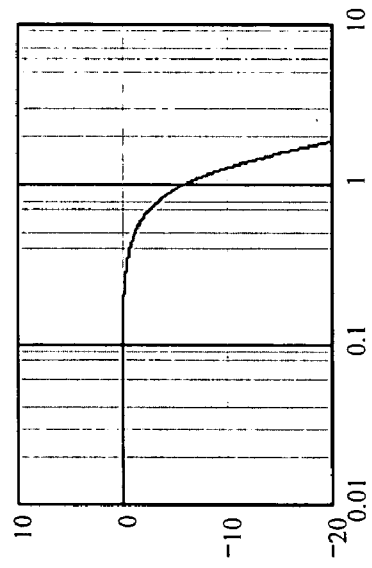
FIGS. 4a and 4b are spectral diagrams of a transmit filter without, and with, frequency peaking, respectively.
Figure 4B:
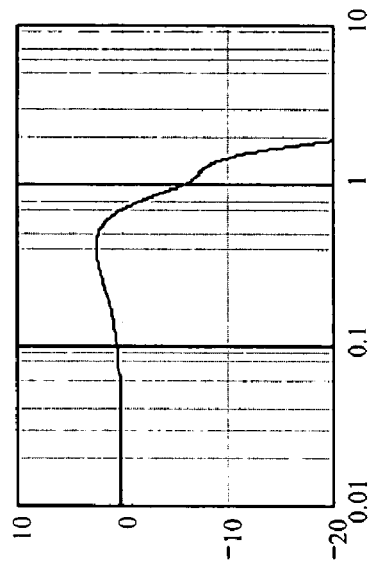

FIG. 4 shows the frequency response of the pre-emphasis network plus the receiver front-end filter modeled as a fixed 7.5 GHz $4^{th}$-order Bessel-Thomson filter. The plot in FIG. 4a shows the response of a conventional transmitter with no frequency peaking. Note that the frequency response if flat and then rolls off. The plot in FIG. 4b shows the response with pre-emphasis peaking added in the transmitter. It clearly shows the increase in the channel response at higher frequencies. The plots are normalized to the same average optical power or optical modulation amplitude (OMA). Both are common descriptions used for the signal strength in a fiber optic link. The vertical axes are in optical dB, and the horizontal axes are frequency normalized to the bit rate (10.3125 Gbits/sec for LRM).

Figure 5A:
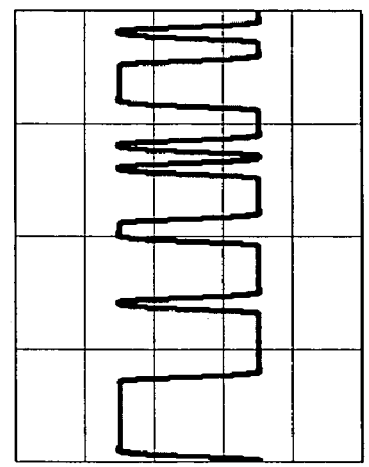
FIGS. 5a and 5b are time traces of optical pulses produced by a transmitter without, and with, frequency peaking, respectively.
Figure 5B:
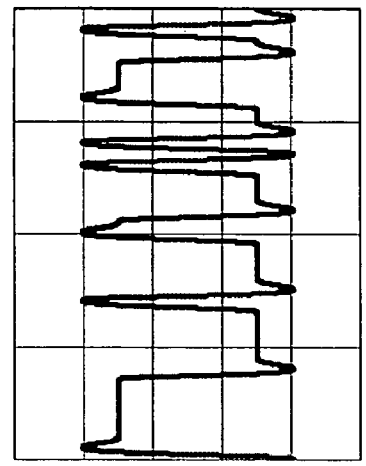

FIG. 5 shows some typical time domain waveforms with and without pre-emphasis. These waveform figures all assume an ideal NRZ pulse train and the receiver front-end model, and the waveforms in FIGS. 5a and 5b have the same average optical power and the same OMA. The plot in FIG. 5a shows the waveform for a conventional transmitter with no frequency peaking. The plot in FIG. 5b shows the waveform with pre-emphasis peaking added in the transmitter.

Figure 6A:
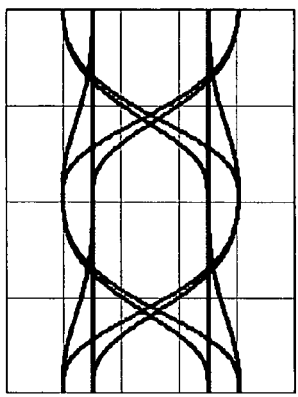
FIGS. 6a and 6b are eye diagrams of the optical pulses in FIGS. 5a and 5b.
Figure 6B:
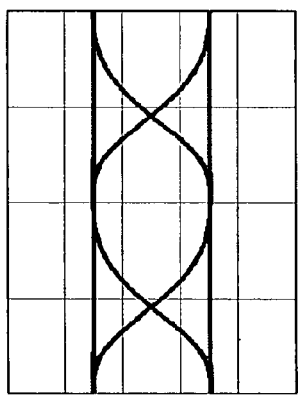

FIGS. 6a and 6b show the same information as FIGS. 5a and 5b, except that the waveform is folded into "eye patterns." Eye patterns are useful for viewing waveform quality in the way that a conventional non-EDC receiver would view the waveforms. An eye pattern that has less jitter and distortion is preferred in a conventional receiver and should produce a lower bit error rate or BER. Note that the pre-emphasized eye is actually more distorted with more jitter when viewed conventionally. However, as shown in the next paragraph, an EDC receiver can equalize this signal to have a better resulting SNR than the signal that has no pre-emphasis.

Figure 7:
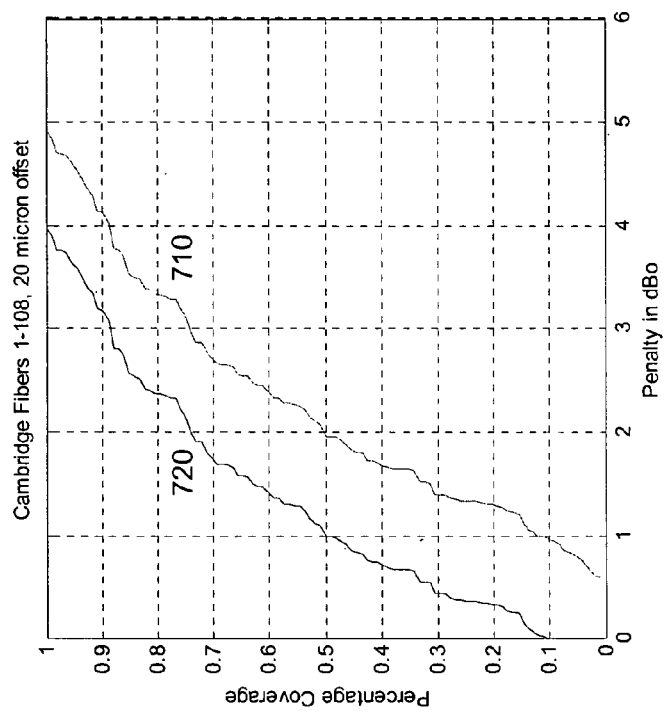
FIG. 7 is a graph that plots the cumulative distribution function of an idealistic power penalty for an EDC receiver.

LRM uses a fiber path model known as the Cambridge set "108 fiber model," IEEE 802.3aq Task Force, Oct. 2004. Available online at http://grouper.ieee.org/groups/802/3/aq/public/tools/108fiberModel. FIG. 7 plots the cumulative distribution function of an idealistic power penalty for an EDC receiver for 300 meters of each of the 108 fibers in the Cambridge 2.1 model. Percentage coverage indicates the percentage of fibers that have a penalty at or below the penalty indicated on the horizontal axis. The penalty on the horizontal axis is expressed in optical dB. Both traces include an NRZ pulse train running at 10.3125 Gbits/sec and the receiver front-end model mentioned before. The trace 710 on the right shows the power penalties with a conventional transmitter with no frequency peaking. The trace 720 on the left shows the power penalties with frequency peaking added in the transmitter. The transmitter with pre-emphasis, even though more jittered and distorted when observed with a conventional eye diagram, shows power penalties for an EDC receiver that are nearly 1 dB lower/better than the one without frequency peaking. This is because an EDC receiver can compensate for the jitter and distortion and apply all the useful signal energy into improving the signal to noise ratio and the BER, or even extending link distance.

Figure 9:
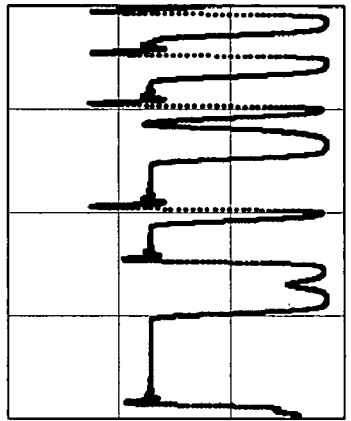
FIG. 9 is a time trace of optical pulses produced by a transmitter with frequency peaking based on relaxation oscillation.
Figure 8:
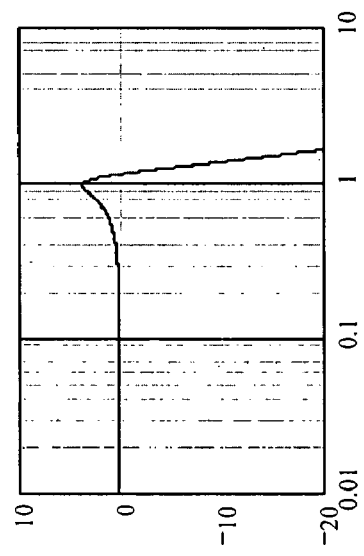
FIG. 8 is a spectral response of a laser diode, illustrating relaxation oscillation.

As mentioned above, a laser diode has a natural peaking phenomenon called relaxation oscillation. FIGS. 8-9 show this with simulated behaviors in the frequency domain (small signal plot) and in the time domain, respectively. As before, these figures include the receiver model. Usually, designers try to avoid relaxation oscillation near the signal bandwidth because it can "close" the eye in a non-EDC link, but with EDC, the effect can be beneficial for the same reasons shown above with pre-emphasis.

Figure 10A:
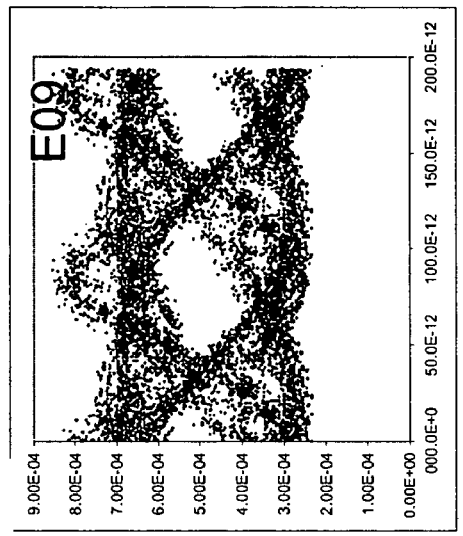
FIGS. 10a and 10b are eye diagrams of optical pulses produced by a transmitter without, and with, frequency peaking, respectively.
Figure 10B:
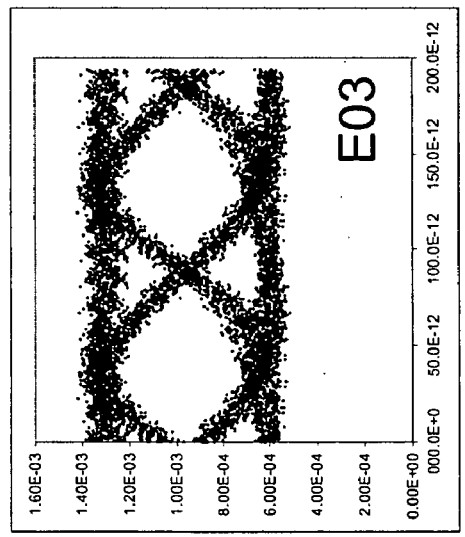

The benefit can also be observed with waveforms from real transmitters measured in the laboratory. FIG. 10a is a normal laser eye waveform (folded into an eye pattern) with little or no overshoot. FIG. 10b is a laser eye pattern with overshoot due to relaxation oscillation.

Figure 11:
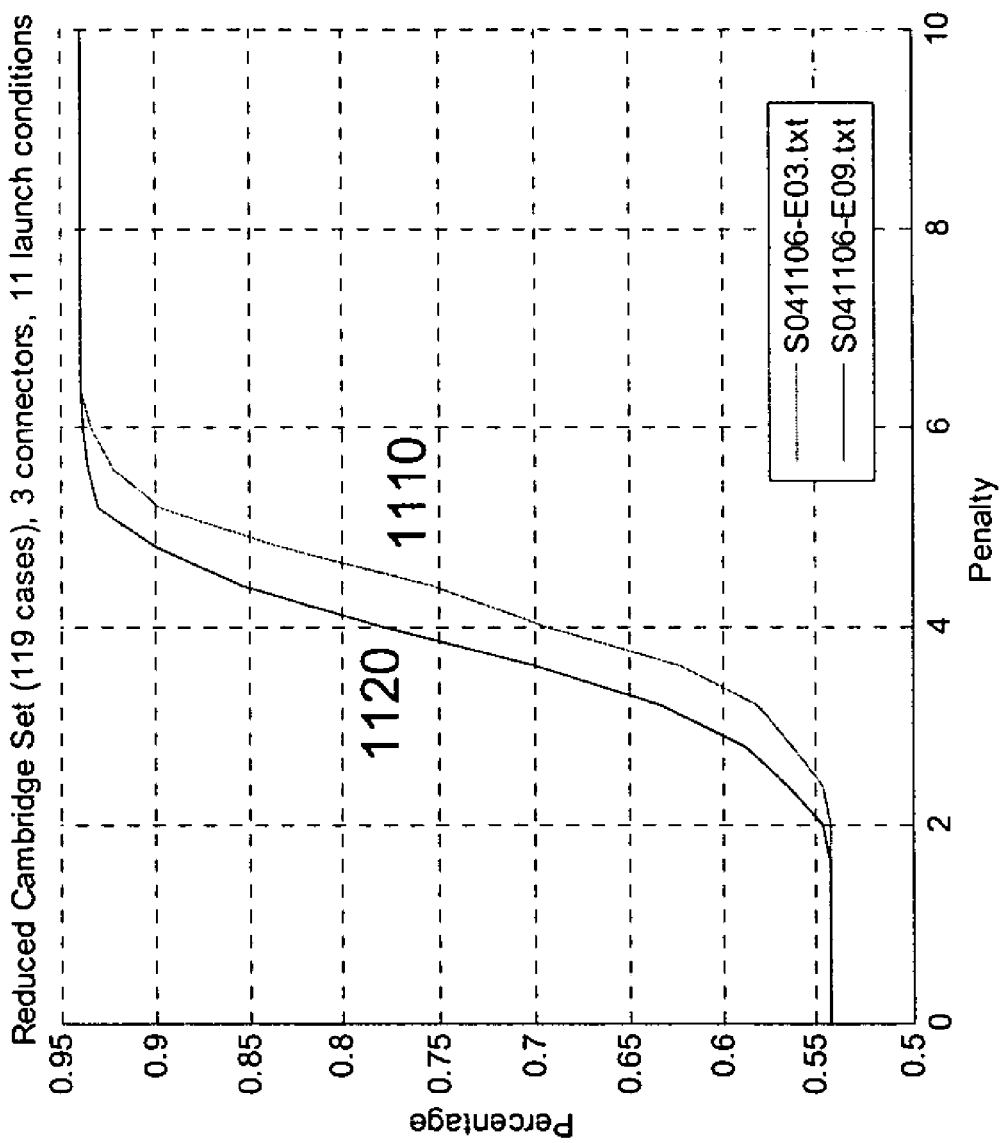
FIG. 11 is a graph of the cumulative distribution function of the optical power penalty, with and without frequency peaking.

The cumulative distribution function of optical power penalties for these transmitted waveforms across fibers in the Cambridge model when received by an EDC system are shown in FIG. 11. The trace 1110 on the right corresponds to FIG. 10a (E03) and the trace 1120 on the left corresponds to FIG. 10B (E09). E09 shows approximately 0.5 dB power penalty improvement at the 80$^{th}$ percentile coverage level (the targeted Cambridge model coverage for LRM) compared to E03 for an EDC system. Again, this is in spite of the appearance of severely greater distortion in the eye pattern.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An optical transmitter for transmitting data over an optical fiber at a specified data rate, wherein the optical transmitter comprises:
   a laser driver receiving the data, the laser driver including a pre-emphasis network amplifying data of a current period of a line rate by a factor of 1+x to generate amplified data, attenuating data of a previous period of the line rate by x to generated attenuated data, where x is a fraction between 0 and 1, and generating modified data by subtracting the attenuated data from the amplified data; and
   a laser coupled to the laser driver, the laser receiving the modified data and encoding the modified data to produce an optical signal suitable for transmission over the optical fiber and having a frequency spectrum that has a relative peak at a peak frequency located in a vicinity of the line rate and the relative peak is relative to a reference frequency spectrum of a reference optical signal produced by an ideal rectangular pulse transmitter encoding the data.

2. The transmitter of claim 1 wherein the peak frequency is between 10% and 100% of the line rate.

3. The transmitter of claim 1 wherein the peak frequency is between 25% and 75% of the line rate.

4. The transmitter of claim 1 wherein the peak frequency is approximately 35-50% of the line rate.

5. The transmitter of claim 1 wherein the optical pulses encode the data based on on-off keying.

6. The transmitter of claim 1 wherein the data rate is approximately 10 G.

7. The transmitter of claim 1 wherein the transmitter complies with a standard specifying a maximum power penalty.

8. The transmitter of claim 1 wherein the modified data from the pre-emphasis network boosts the peak frequency of the optical signal relative to a DC frequency.

9. The transmitter of claim 8 wherein the pre-emphasis network has a transfer function of (1+x)−xD, where and D is a delay equal to one period of the line rate.

10. The transmitter of claim 9 wherein x is approximately 0.25.

11. The transmitter of claim 8 wherein the pre-emphasis network is clocked.

12. The transmitter of claim 8 wherein the pre-emphasis network is a passive network.

13. The transmitter of claim 1 wherein the transmitter has a lower power penalty than the ideal rectangular pulse transmitter.

14. The transmitter of claim 1 wherein the transmitter has a lower PIE-D power penalty than the ideal rectangular pulse transmitter.

15. The transmitter of claim 1 wherein the peak frequency is located in a frequency band that is attenuated by the optical fiber.

16. The transmitter of claim 1 wherein the transmitter complies with an X2, XFP or SFP+ form factor.

17. A method for transmitting data over an optical fiber at a specified data rate, the method comprising:
   receiving the data;
   generating amplified data by amplifying data of a current period of a line rate by a factor of 1+x, where x is a fraction between 0 and 1;
   generating attenuated data by multiplying data of a previous period of the line rate by x;
   generating modified data by subtracting the attenuated data from the amplified data; and producing an optical signal that encodes the modified data and is suitable for transmission over the optical fiber, wherein the optical signal has a frequency spectrum that has a relative peak at a peak frequency located in a vicinity of a line rate and the relative peak is relative to a reference frequency spectrum of a reference optical signal produced by an ideal rectangular pulse transmitter encoding the data.

18. The method of claim 17 wherein the peak frequency is between 10% and 100% of the line rate.

19. The method of claim 17 wherein the peak frequency is between 25% and 75% of the line rate.

20. The method of claim 17 wherein the step of producing the optical signal comprises producing the optical pulses based on on-off keying of the data.

21. The method of claim 17 wherein the data rate is approximately 10 G.

22. The method of claim 17 wherein the modified data boosts the peak frequency relative to a DC frequency.

23. The method of claim 17 wherein the optical signal has a lower power penalty than the ideal rectangular pulse transmitter.

24. The method of claim 17 wherein the peak frequency is located in a frequency band that is attenuated by the optical fiber.

25. The transmitter of claim 1 wherein the transmitter has a lower transmit waveform and dispersion penalty (TWDP) than the ideal rectangular pulse transmitter.

* * * * *